May 7, 1963  H. J. EN DEAN  3,088,491
PIPELINE BATCHING PIG
Original Filed Oct. 26, 1960
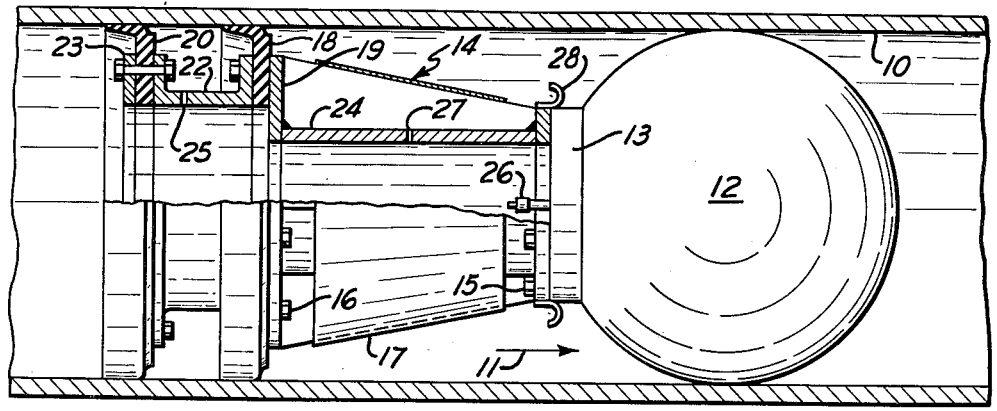
INVENTOR.
HOWARD J. ENDEAN
BY
ATTORNEY

United States Patent Office 3,088,491
Patented May 7, 1963

3,088,491
PIPELINE BATCHING PIG
Howard J. En Dean, Houston, Tex., assignor to Gulf Research & Development Company, Pittsburgh, Pa., a corporation of Delaware
Original application Oct. 26, 1960, Ser. No. 65,185, now Patent No. 3,074,436, dated Jan. 22, 1963. Divided and this application June 5, 1962, Ser. No. 200,166
3 Claims. (Cl. 137—802)

This invention relates to pipeline operation and in particular pertains to an improved device employed for mechanically separating two batches of fluid that are successviely pumped through a pipeline.

This application is a division of my copending application Ser. No. 65,185 filed October 26, 1960 now Patent 3,074,436 assigned to the same assignee as the present application.

In pipeline operation it is common practice to pump different fluids through the line in succession. In order to minimize commingling of the fluids at the interface between them it is common practice to employ a device called a batching pig. The purpose of the batching pig is to form a mechanical barrier between the two successive fluids to prevent or at least materially reduce commingling of the fluids. It is desirable that the batching pig form a sliding seal against the pipe wall so that substantially no fluid will by-pass the batching pig as it is carried along by the flowing fluid.

Difficulty is experienced in providing a batching pig that maintains the seal against the pipe wall at all parts of the pipeline. The heretofore used types of devices tend to lose the seal at certain fittings usually found in a pipeline. At bends in the line the bend may so deform an elongate separator that the seal is broken and some degree of by-passing may occur. At joints such as T's or Y's, the inside diameter of the fitting may differ from that of the pipeline proper so that by-passing may occur. Pipelines also commonly have a large number of valves since these are required for performing the necessary switching operations. Check valves which are present in the pipeline to prevent reverse flow are particularly difficult for the heretofore known types of batching pigs to traverse satisfactorily. In particular, any variation in the normal internal diameter of the pipeline presents a problem in the operation of a batching pig in that places of reduced diameter cause the device to stick, whereas places of non-circular section or of enlarged diameter allow the fluid to by-pass the batching pig for the time required for the device to traverse the anomalous section. In the event that the sealing elements of the pig have become worn so that their diameter is smaller than normal, even a nominal enlargement in the pipeline will allow a substantial degree of by-passing and in severe cases the device may even lose its propelling effort so that it will lodge in the enlargement and cease to perform its intended function.

It is the purpose of this invention to provide an improved fluid separator or batching pig for use in a pipeline that avoids the above-mentioned difficulties.

It is a further object of this invention to provide a pipeline batching pig that has improved sealing properties in that it maintains its seal while traversing enlargements which it traverses more quickly than heretofore known devices and without danger of lodgment, and that is capable of traversing bends, valves, and constrictions with reduced danger of sticking.

These and other objects of this invention are accomplished by the herein described apparatus, reference being made to the accompanying drawing which illustrates one embodiment of my invention in which a spheroidal sealing member and a cup-shaped sealing member are rigidly connected.

The heretofore commonly used types of batching pigs generally have two or more elastic cups or discs mounted on the device, the cups having turned back lips that seal against the pipe wall in the manner of the well-known pump cup or washer. These have the disadvantage that the seal is broken as the cup traverses an irregularity, and they also wear rapidly with resulting loss of seal. More recently a type of elastic ball or sphere has been employed as a pipeline fluid separator, the sphere being made of elastic material, either solid or hollow, and in the latter case the sphere is filled with liquid. The sphere if solid is usually somewhat larger in undeformed outside diameter than the inside diameter of the pipe, so that upon insertion in the pipe the device is elastically deformed and takes on the shape of a prolate spheroid which seals against the pipeline wall. In the case of a hollow sphere, the empty sphere is usually somewhat smaller in undeformed outside diameter than the nominal inside diameter of the pipe in which it is to be used, and the sphere is filled with liquid (usually water) under pressure thereby to expand the filled sphere to an outside diameter that is slightly larger than the inside diameter of the pipe, so that upon insertion in the pipe the device is elastically deformed and takes on the shape of a prolate spheroid which seals against the pipeline wall. While the sphere type of device has better sealing and wearing qualities than the disc or cup type device, the sphere is much more expensive and is also more prone to lodge or hang up.

The batching pig of this invention retains the desirable qualities of both the sphere type and the cup type device and in particular employs the advantageous qualities of each type to compensate the shortcomings of the other.

The batching pig of this invention comprises two sealing elements, the leading one of which is spheroidal in shape, and which sealing elements are mechanically connected so as to traverse the pipeline in tandem with the spheroidal element forward. The rearward sealing element is provided with a fluid by-pass channel of restricted flow capacity. The rearward sealing element is preferably cup-shaped, but alternatively may be disc-shaped or spheroidal in shape.

Referring to the drawing, there is shown the pipe 10 forming the normal pipeline conduit with the direction of fluid flow indicated by the arrow 11. The batching pig of this invention employs at least two sealing elements, the leading one 12 being prolate spheroidal in shape. The spheroidal element 12 may be solid or hollow as such elements are generally made, and if hollow, the element is filled and sized with liquid as is customary. The element 12 is made of oil-resistant elastomer such as synthetic rubber and is compounded so as to have optimum wearing qualities as is well known in the art. Inasmuch as the spheroidal element 12 has other elements attached thereto, it is preferred to bond onto or mold into the material of the spheroid a metal base plate 13 provided with tapped screw holes so that the base plate 13 may serve as a convenient means for fastening other elements to the spheroid 12.

A valve stem 26 is provided to form a connection to the interior of spheroid 12, the valve stem being conveniently mounted on the base 13 of the spheroid. A conventional check valve (not shown) is provided in the valve stem 26 so that the spheroid may be filled and sized by the injection of liquid through the valve stem 26. After filling and sizing the spheroid, the valve is sealed by a conventional valve cap. Proper sizing of the spheroid 12 is such that about ⅛-inch of flattened cylindrical contact is made for each inch of nominal pipeline diameter. Thus for example, a spheroid for use in an 8-inch diameter pipeline is sized so that about 1-inch axial length cylindrical contact is made with the inside surface of the pipe.

The spheroid 12 is attached to a frame 14. In the embodiment illustrated in the drawing, the frame 14 comprises a rigid hollow cylinder 24 made of metal, such as aluminum. The cylinder 24 is provided at the front end with an annular flange welded to the cylinder, and the flange is drilled for bolts 15. At the rear end of cylinder 24 is welded a rear flange 19 that is drilled for bolts 16. Longitudinal ribs may be welded between the end flanges to add strength to the assembly. The bolts 15 unite the forward flange of the frame 14 with the base 13 of the spheroid. The frame 14 is provided with a tapered, e.g. frusto-conical, shroud 17 whose larger end is adjacent to and approaches the diameter of a scraper cup 18 as shown in the drawing.

The rearward flange 19 of the frame 14 connects to one or more scraper cups 18 and 20. These are well-known devices made of rubber or other elastomer having an annular backward turning lip that seals against the pipe wall. The scraper cup 18 is fastened to the frame 14 by means of bolts 16. If desired, more than one scraper cup may be employed at the rearward end of the assembly and the respective cups are joined by means of an annular rigid coupling member 22. An annular end plate 23 serves to clamp the rearmost scraper cup 20 in place on the coupling member 22. Alternatively, instead of using one or more scraper cups as the rearward sealing element, a second spheroid may be employed. It is preferred to use scraper cups as the rearward sealing element because they are more economical and the rearward sealing element is employed primarily as an auxiliary propelling means whereas the seal is primarily effected by the forward spheroidal sealing element 12.

The axial length of the frame 14 depends on the radius of curvature of minimum bends in the pipeline and the length of enlarged regions such as are found in valves to be traversed. The frame 14 is made long enough so that the sealing elements 12 and 18 will span or straddle an enlarged region of the pipeline such as the body of a check valve, whereby while one sealing element is in the enlarged region the other sealing element maintains a seal in the adjoining normal pipe. However, the length of the frame 14 should not be made excessively long because this prevents the assembly from easily negotiating sharp bends in the pipeline.

The frame 14 forms a bar or partition that serves to separate the pipeline space behind the rearward sealing element from the pipeline space intermediate between the forward and the rearward sealing elements. An important feature of this invention is that a flow by-pass of restricted flow capacity is provided around the rearward sealing member or members. This comprises one or more small bleed holes 27 that are drilled in the cylinder 24 of frame 14. For example, in a batching pig of the type shown in the drawing for use in a 24-inch pipeline the holes 27 may be four in number and be about ¼-inch in diameter. The holes 27 form a flow channel of restricted flow capacity that will allow access of the pipeline pressure from behind the rearmost scraper 20 to the pipeline space immediately behind the forward spheroid 12, but permitting only a small amount of fluid flow as compared to the pipeline capacity. The coupling member 22 is also provided with one or more small holes 25 so as to provide access of the pipeline pressure to the space between the individual members 18 and 20 of the rearward sealing member.

The device is launched in the pipeline by means of a conventional scraper trap and recovered by similar means. A plurality of grapple hooks 28 are welded to the forward flange of frame 14 to provide means to facilitate handling of the assembly. The assembly is inserted with the spheroid 12 leading. The rear scraper cups 18 and 20 provide supplementary propulsion in traversing pipe-line conditions which cannot be satisfactorily negotiated by a spheroid alone, such conditions being illustrated by T's, check valves, etc. The device is particularly advantageous in that it provides the excellent sealing qualities of the spheroid and it eliminates the undesirable tendency of the spheroid to hang up in enlargements in the pipeline because the scrapers push the spheroid on through any anomalous pipeline condition into the normal section of pipe. A further advantage of the invention is that at T connections where the side conduit carries substantial flow an isolated spheroid may actually stick to and seal off the side opening, whereas the device of this invention pushes the spheroid beyond the side opening so that the separator can continue its traverse through the pipeline.

The by-pass channel around the rearward sealing member serves two purposes. It provides a reduced pressure differential across the rearward sealing element, thereby substantially reducing the wear on this element. As the pressure across the rearward scraper is reduced, the force which the lip of the scraper cup exerts against the pipe wall is reduced and this results in reduced wear. Also by providing a by-pass across the rear sealing member the pressure behind the forward sealing member may momentarily build up to a high value whenever the forward sealing member becomes stuck so that maximum effort is brought to bear to dislodge the stuck member. On the other hand, if the forward spheroid should lose its propelling effort due to blow-by of fluid in an enlarged section of the pipeline, the restricted by-pass of the rearward sealing element will permit a substantial differential pressure to build up across the rearward sealing element, with the result that the rearward sealing element provides the necessary propelling effort to push the assembly on into the normal part of the pipeline.

What I claim as my invention is:

1. A batching pig for a pipeline having enlargements at fittings, check valves, and the like comprising at least two sealing members adapted to be inserted in the pipeline and forming sliding seals against the interior wall of the pipe, connecting means between said sealing members adapted to transmit propulsive effort from one of said sealing members to the other and to space said sealing members a distance greater than the length of enlarged sections of the pipeline, the outer surface of said connecting means being frusto-conical in shape with the larger end thereof adjacent to and approaching the diameter of the rearward sealing member, said connecting means cooperating with the forward sealing member to provide substantially an imperforate barrier in the pipe, restricted flow-carrying means providing a hydraulic bypass for the rearward sealing member, at least one of said sealing members being spheroidal in shape with its axis of revolution parallel to the axis joining said sealing members.

2. A batching pig for a pipeline having enlargements at fittings, check valves, and the like comprising at least two sealing members adapted to be inserted in the pipeline and forming sliding seals against the interior wall of the pipe, connecting means between said sealing members adapted to transmit propulsive effort from one of said sealing members to the other and to space said sealing members a distance greater than the length of enlarged sections of the pipeline, the outer surface of said connecting means being frusto-conical in shape with the larger end thereof adjacent to and approaching the diameter of the rearward sealing member, said connecting means cooperating with the forward sealing member to provide substantially an imperforate barrier in the pipe, restricted flow-carrying means providing a hydraulic bypass for the rearward sealing member, said forward sealing member being spheroidal in shape with its axis of revolution parallel to the axis joining said sealing members.

3. A batching pig for a pipeline having enlargements at fittings, check valves, and the like comprising at least two sealing members adapted to be inserted in the pipeline and forming sliding seals against the interior wall of the pipe, connecting means between said sealing members adapted to transmit propulsive effort from one of said sealing members to the other and to space said sealing members a distance greater than the length of enlarged sections of the pipeline, the outer surface of said connecting means being tapered with the larger end thereof adjacent to and approaching the diameter of the rearward sealing member, said connecting means cooperating with the forward sealing member to provide substantially an imperforate barrier in the pipe, restricted flow-carrying means providing a hydraulic by-pass for the rearward sealing member, said forward sealing member being spheroidal in shape with its axis of revolution parallel to the axis joining said sealing members.

No references cited.